United States Patent

[11] 3,599,404

[72] Inventors Carlos Manuel Cruz Fernandez
7605 55th St. Marianao;
Rogelio Rodriguez Valdes, 21415, 67 Ave.
LaLisa Marianao; Delfin Perez Alberto, 68
Perkins St. Luyano Marianao, all of
Havana, Cuba
[21] Appl. No. 814,338
[22] Filed Apr. 8, 1969
[45] Patented Aug. 17, 1971
[32] Priority Apr. 9, 1968
[33] Cuba
[31] 207-744

[54] SUGAR CANE HARVESTERS
1 Claim, 6 Drawing Figs.

[52] U.S. Cl. ............................................................. 56/12.8,
56/14.3, 56/14.5, 56/15.8, 56/98
[51] Int. Cl. ............................................................. A01d 45/10
[50] Field of Search............................................. 56/17, 56,
60, 61, 64, 98, 12.8

[56] References Cited
UNITED STATES PATENTS
2,482,530  9/1949  Wurtele .................... 56/17 X
2,634,569  4/1953  Raney et al. .............. 56/60 X
2,647,353  8/1953  Dort ......................... 56/64
2,648,942  8/1953  Grant et al. .............. 56/62 X
2,953,886  9/1960  Douglas et al. ........... 56/17
3,095,680  7/1963  Thornton .................. 56/17
3,144,743  8/1964  Gaunt et al. ............. 56/17
3,325,982  6/1967  Fogels et al. ............. 56/56
3,394,535  7/1968  Roberts .................... 56/17
3,456,429  7/1969  Sexton, Jr. .............. 56/17 X
3,492,798  2/1970  Hart ......................... 56/17

FOREIGN PATENTS
13,517   8/1934  Australia ................... 56/17
243,182  1/1963  Australia ................... 56/17

Primary Examiner—Louis G. Mancene
Assistant Examiner—Jay N. Eskovitz
Attorney—Robert G. McMorrow ABSTRACT: A sugarcane harvesting combine has a mobile chassis with a supporting framework and wheels, and adjustable cane top severing mechanism consisting of a shielded disc with blades, and hydraulic adjustment means, rods to direct the cane to the top cutting area, curved paddles to discharge the cane tops, and a stalk severing mechanism with oppositely rotating horizontal cutters on hydraulically controlled skids, means directing fallen cane into the stalk cutting mechanism, and a series of conveying means to dispose of the cut cane INVENTORS
CARLOS MANUEL CRUZ FERNANDEZ,
ROGELIO RODRIGUEZ VALDES,
DELFIN PEREZ ALBERTO,
BY

*Robert G. McMorrow*
ATTORNEY

FIG. 2.
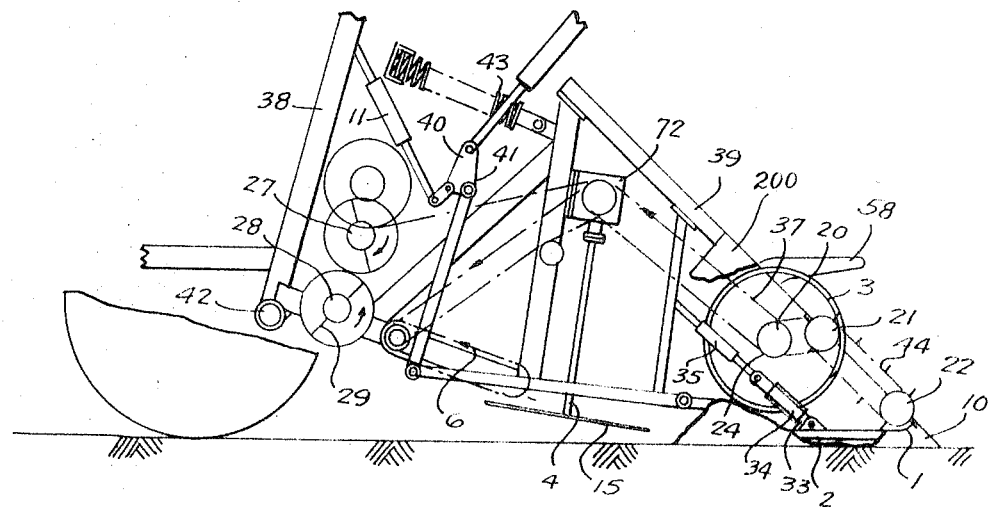
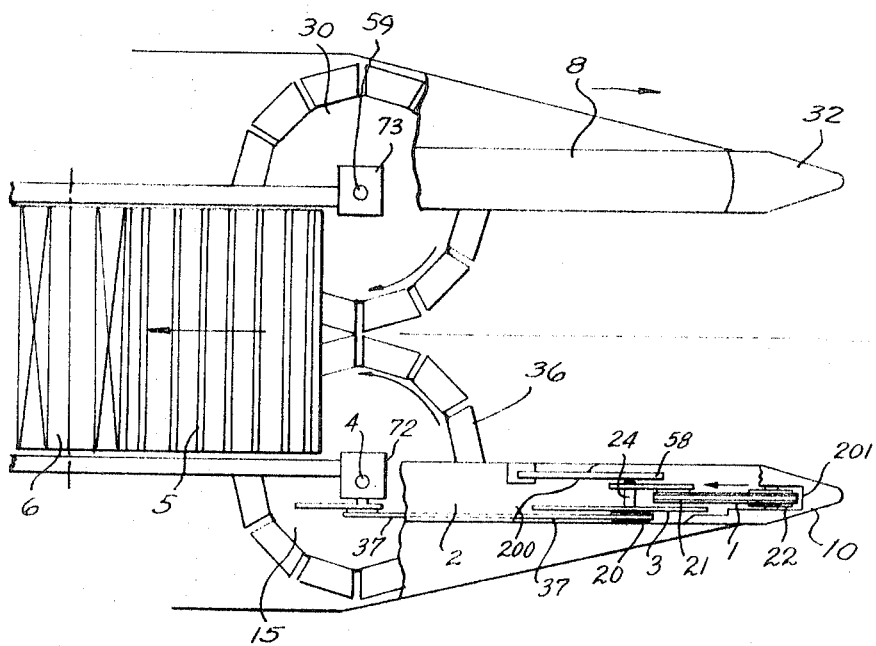
FIG. 3.

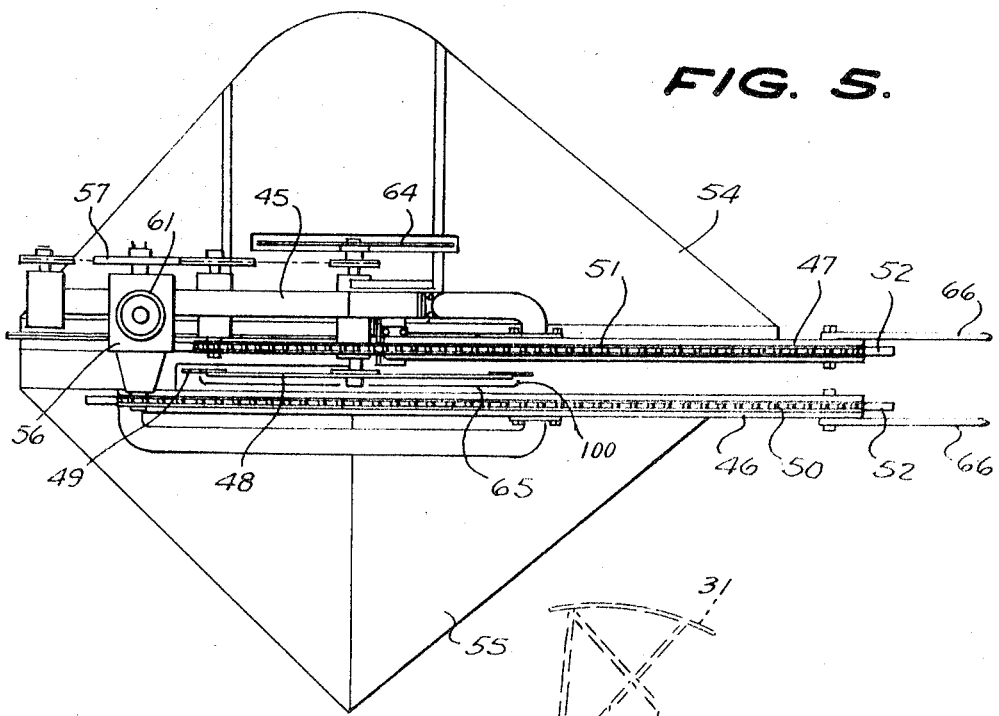
FIG. 5.
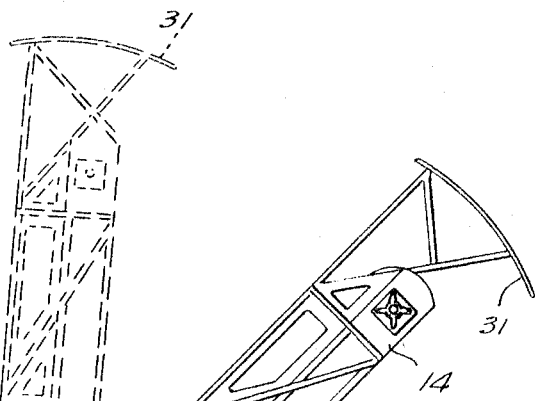
FIG. 6.
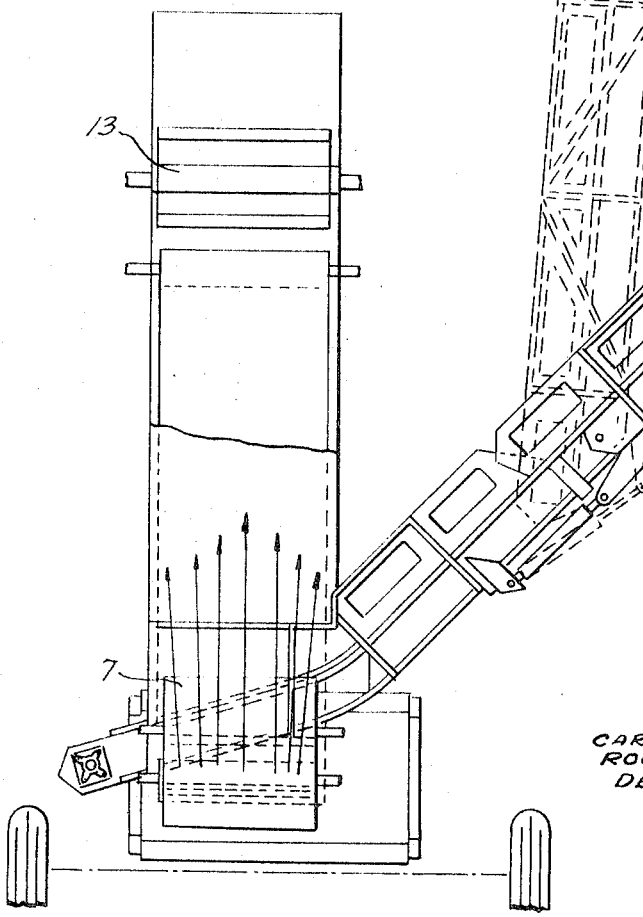
INVENTORS.
CARLOS MANUEL CRUZ FERNÁNDEZ,
ROGELIO RODRÍGUEZ VALDÉS,
DELFÍN PÉREZ ALBERTO
BY
Robert G. M. Morrow
ATTORNEY.

SUGAR CANE HARVESTERS

BACKGROUND OF THE INVENTION

1. Field of the Invention

This invention relates to harvesting combines and more particularly to a combine particularly adapted to the cutting and processing of sugarcane.

2. Statement of the Prior Art

Prior patents relating to the cutting of sugarcane and the subsequent treatment and conveyance of the cane are characterized as comprising mobile apparatus with both forwardly mounted cutting mechanisms and topping mechanisms, and internal chopping machines with rearward conveyors.

SUMMARY OF THE INVENTION

This invention is related to that category of sugarcane harvesting machines known as combines and a principal objective of the invention is to produce a combine which incorporates improvements which render it more efficient, economical and durable. Another purpose of this invention is to provide a machine to harvest sugarcane regardless of cane variety, thickness of "stand" or tilt of the stalks, as well as of entangled stalks with dead leaves clinging to them, or one which is equally efficient in cane fields which have been burned over before harvesting. Another purpose of this invention is to supply a machine that will cut sugarcane stalks at the upper part thereof, freeing the cane stalk of leaves or tops, and at the bottom part at ground level without regard to terrain contour, finally cutting the cane stalk into small sections, freeing it of straw and other foreign matter and loading it onto a vehicle alongside the machine.

Another purpose of the invention is to provide machines with devices as aforesaid which permit the suspension of the front section or nose in a manner adapted to absorb the weight of that section upon the ground; devices to regulate and set the height of the lower cutters thus regulating the height of cut of the machine while following terrain contour, and to permit either of two sides of the front section to adjust vertically independently of the other.

Still another purpose of this invention is to provide a machine of this description with a device for cutting the tops of sugarcane stalks. The cutting device is characterized by its lateral, downward tilt, which once set may be altered independently of the height of the cane.

With the aforementioned purposes and others that will appear hereinafter, it will be observed that this machine is of novel design with respect to the arrangement of parts and sections.

It is generally recognized that much work has been done on machines of this type which, in general, have not been completely satisfactory since they are unable to maintain the cut of the cane at ground level while operating on uneven terrain, and do not function satisfactorily with leaning or entangled cane or free the cane of all foreign matter and straw. The present invention is directed to elimination of those difficulties. Upon entering the cane field, the machine of this invention gathers the cane stalks between two walls located on its front section or nose, cutting the cane stalks at their upper parts, freeing them of leaves and tops by means of a hydraulic device operated by the driver which sets the height of cut to the level at which the tops or leaves begin. As the tops are cut, the machine cuts the stalks at their lower part at ground level by means of two disc cutters revolving toward the center of the machine. The cane stalks then enter a belt which conveys them to a device which cuts the stalks into small sections, after which the sections are hurled onto an intermediate conveyor belt which carries them to the rear of the machine from which they are dumped onto a toothed or smooth surfaced drum which acts as a deflector. The sections then drop through an air current onto another conveyor belt which carries them, already freed of straw and other foreign matter, to a vehicle propelled alongside the combine. Other features of the invention will be observed in the following description, especially by experts in the field, and with reference to the enclosed drawings, in which like numerals refer to corresponding parts.

BRIEF DESCRIPTION OF THE DRAWING

FIG. 2 is a lateral elevation of the front section or nose of the machine;

FIG. 3 is a top view of the mechanism of the front section, partially broken away for disclosure of details;

FIG. 5 is a lateral elevation of the aforementioned device for the cutting of the leaves or tops of the cane; and FIG. 6 is an elevation of the rear section of the machine.

DESCRIPTION OF THE PREFERRED EMBODIMENT

This machine comprises a self-propelled chassis 16 with two directional steering or rubber ground wheels 17 on its rear section, two rubber wheels or traction ground treads 18 at the front section thereof and a frame work structure, built on the chassis, which supports the various mechanisms of the machine.

Figure 4:
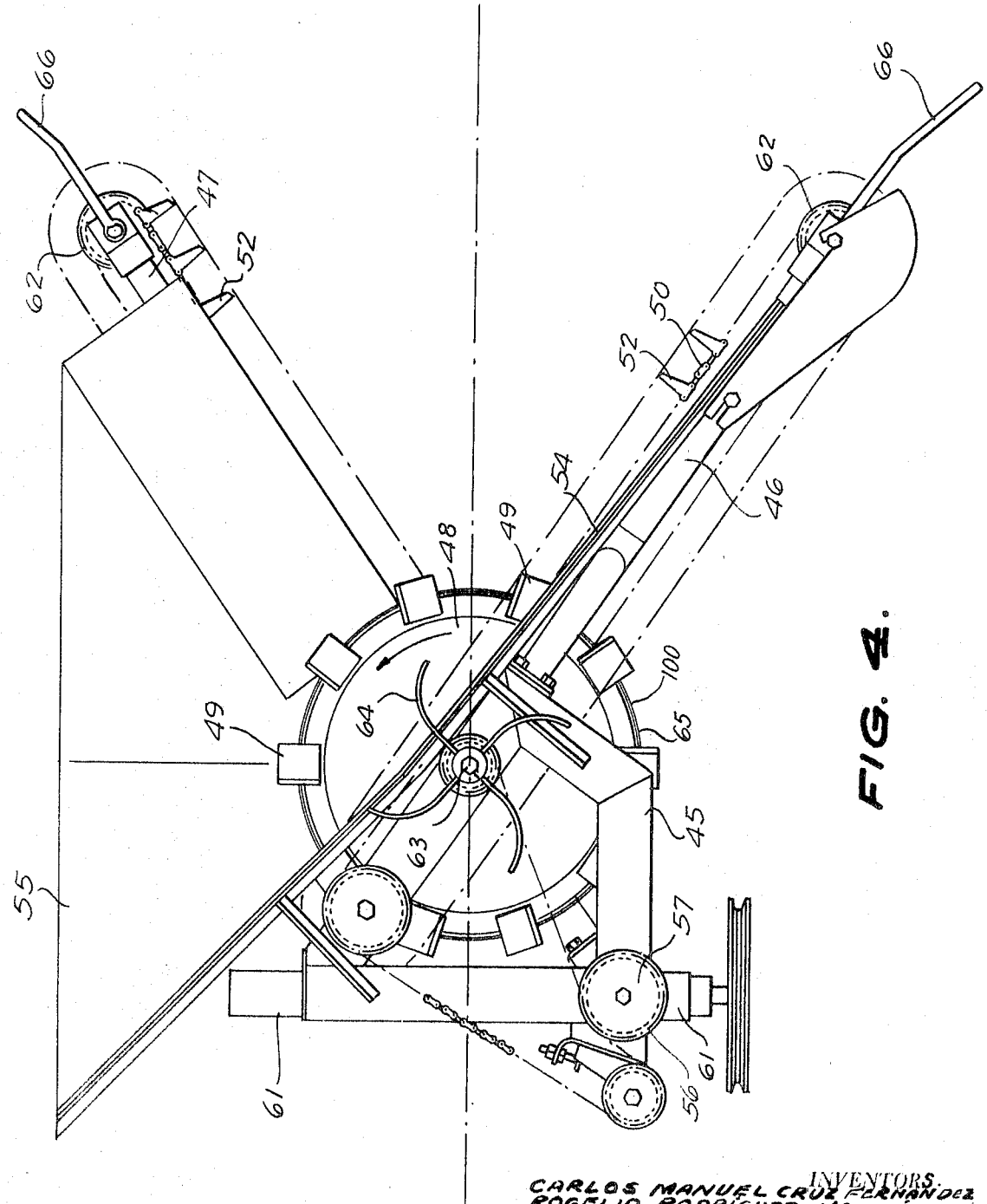
FIG. 4 is a top view of the mechanism of the device for cutting the leaves or tops of the cane.

Mounted on the chassis 16 is an engine 19 which, through the necessary connections and transmissions, provides the motive power for the machine. The top cutting mechanism, FIGS. 4 and 5, is located on the upper forward section of the machine and is mounted on a support 26 to which it is connected by two pivots 61 shown in FIG. 4. This support 26 is connected on its opposite end to a member 38 which is part of the framework 23, the support being pivotal on an axle 25 located in the upper end of the aforementioned member 38. The support 26 is operated by two hydraulic cylinders 9 to selectively lower or raise the top cutting mechanism to conform to the height of the cane.

The top cutting device comprises a framework 45 which supports two arms 46 and 47 extending forward, the arms forming an angle at the apex of which is located a cutting disc 48. The arm 46 is located to the right and above the disc 48, and the arm 47 is disposed to the left and below the aforementioned disc 48.

The framework 45 supports, in addition to the arms 46 and 47, the cutting disc 48 and a reducing gear box 56 which receives power through a pulley 53 and transmits it by means of a sprocket 57 and chain 51.

The cutting disc 48 includes an edge having a series of rectangular blades 49, and the disc rotates in a counterclockwise direction as shown in the drawing. The blades 49 cut the sugarcane tops when the cane passes over a chain 50 provided with fingers 52 pressing against the edge of the cutting blades.

The axle 63 which drives the disc 48 has several curved paddles 64 on its upper part, whose function is to aid in dislodging the cane tops by striking them and hurling them away from the working area of the machine. The disc or cutter 48 is covered on its lower part by a shield 65 mounted on the framework 45 and arm 47. As shown in FIG. 5, the shield 65 is provided with an upturned peripheral lip 100 below the blades 49. When the disc is in motion this shield keeps pieces of dry or green leaves from being drawn in, which would clog other parts of the mechanism and impair the operation thereof.

At an extremity of each arm 46 and 47 there is a sprocket 62 which functions to guide the chain 50 and the associated fingers 52 to feed the cane stalks toward the cutter 48 which cuts the cane tops. The aforementioned arms 46 and 47 have, on their forward ends, rods 66 which are slightly curved outward, so as to reach erect stalks which lie beyond the maximum lateral range of the chains 50 and direct those stalks toward the chains.

Figure 1:
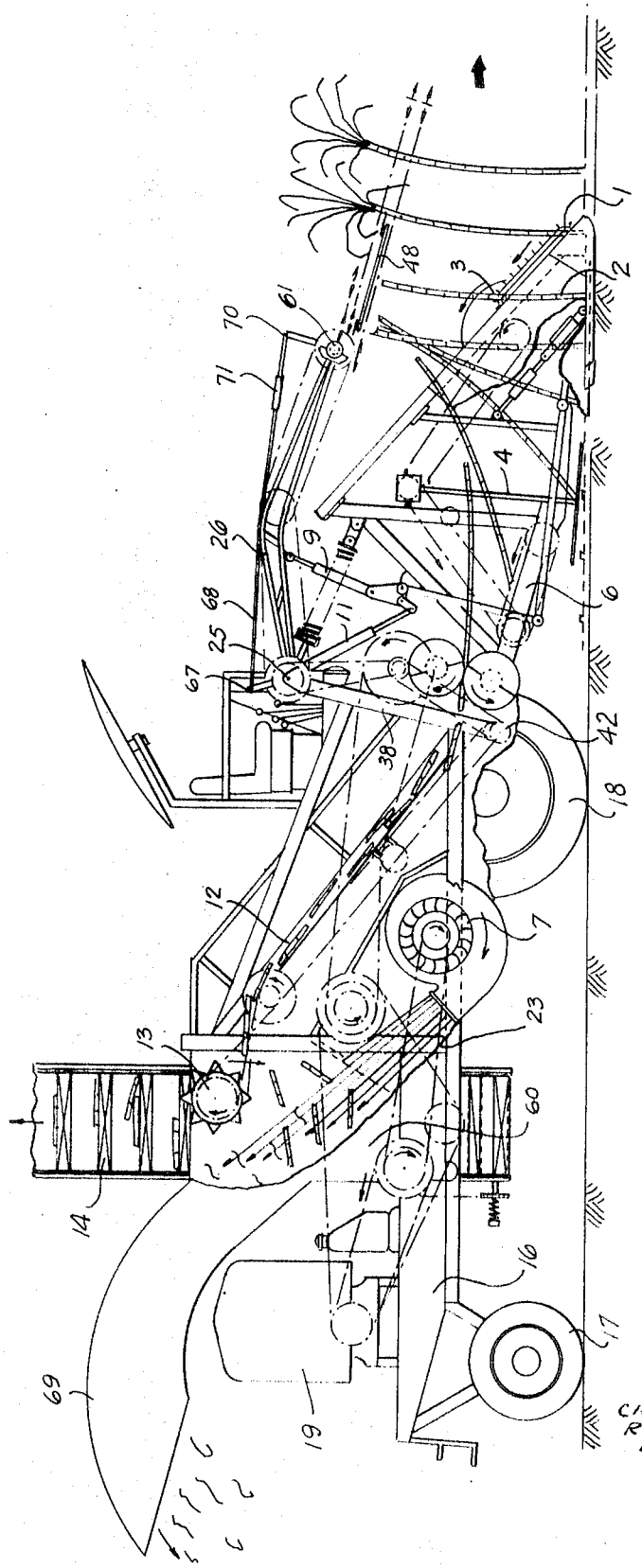
FIG. 1 is a lateral elevation of the machine which is the subject of this invention.

The top cutting device is provided with plate elements 54 and 55, shown in FIGS. 4 and 5 conveniently located to facilitate the dislodgement of the cane tops and keep them away from the working area of the machine. For the accomplishment of certain variations as to the angle of this mechanism with regard to its horizontal line of travel, the machine is equipped with a system of levers and rods 67, 68 and 70 shown in FIG. 1, whose position is maintained by means of a tension device 71 so that when the support 26 is raised or lowered by the hydraulic cylinder 9 the angle of cut will remain as previously set. The stalk cutting mechanism, FIGS. 1 through 3 is located in the front lower section of the machine and comprises two hollow vertical walls of equal size 2 and 8 positioned parallel to each other, whose upper edges 39 are inclined upwards and rearwards. The walls have covers 200 of sheet metal with slots 201 therein. These walls form a throat to receive the row of stalks to be cut as the machine advances. In the central lower part of the throat there are provided a pair of cutters, slightly tilted downward at the front which rotate in opposite directions toward the center of the row of cane stalks. These cutters are moved by two axles 4 and 59 linked to two reduction gears 72 and 73 located in the upper inner part of walls 2 and 8 which, due to their location, do not impede the passage of the cane when being cut. The height of these two cutters in relation to the ground may be controlled by means of two skids 10 and 32 through a bar and guide connected to each skid and operated independently by a hydraulic cylinder 35. The cutters comprise two discs 15 and 30 having blade segments 36 about the peripheries thereof and which are of polygonal form. Inside of the wall 2 there is an auxiliary cutting mechanism for those stalks which are either tilted or flat on the ground and have dead leaves attached thereto. This mechanism comprises an endless chain 1 provided with fingers 44 and driven by two sprockets 21 and 22. The purpose of this mechanism is to propel the cane stalks and dry leaves toward a circular cutter 3 mounted in a vertical position and provided with teeth or knives, which rotate on an axle 24 and is driven by a sprocket 20 and transmission chain 37. Adjacent the cutter 3 is an arm 58 which extends forward in such manner as to engage all tilting cane stalks that might be beyond the cutters radius of action and which serves additionally to provide cut resistance thereto.

In order to maintain the cutting at a set height, the machine includes a terrain contour following mechanism, FIGS. 1, 2 and 3 consisting of skids 10 and 32 located at the front end of the walls 2 and 8 and connected to the nose or front section of the machine by means of bars 33, guides 34 and a hydraulic cylinder 35, the nose pivoting on axle 42. This mechanism makes it possible for the machine to follow the contour of the cane field by operating the front section or nose through a stationary member 41 to which a movable member 40 is attached. This movable member is connected to a hydraulic cylinder 11 which is connected to a member 38 of the structure 23. For driving from one canefield to another and for turning, the nose is raised by a hydraulic cylinder 11 one of the ends of which is attached to a member 38 of the structure 23 while the other end pulls a movable member 40 connected to a stationary member 41. The nose or front section is held in working position by means of a system of coil springs 43 which relate the major portion of the weight of the nose to the framework 38. The remainder of the weight is supported by the skids 10 and 32, thus allowing the terrain following device to slide over the irregularities of the land and insuring contact with the ground.

At the upper rear part of the cutters 15 and 30 there is provided a conveyor belt 6, shown in FIGS. 1, 2 and 3 which feeds the mechanism that cuts the cane stalks into small sections after being severed adjacent ground level and freed of their tops. This conveyor belt is made up of flat bars or strips with irregular edges 5 set on end, which lead the stalks to a pair of drums 27 and 28 set horizontally one above the other, the upper ones slightly displaced forward. These drums rotate in opposite directions and each is completely covered by a knife 29. When the drums rotate these knives coincide, cutting the cane and driving the stalk sections toward conveyor belt 12 which drives them onto a rotating deflector 13. The deflector 13 in turn distributes the sections conveniently into a box 68. The bottom of this box is formed by inclined conveyor belt 14 which loads the cane sections onto a vehicle for transportation to the sugar mill. Straw and other foreign matter mixed with the stalks is blown off the cane sections by an air blast moving in the opposite direction. The air blast is produced by centrifugal fan 7. The straw and other foreign matter is blown out through a hatch 69 in the upper rear section of the machine. The deflector 13 consists of a rotating drum, which may be either smooth or serrated lengthwise, and whose function is to continuously change the angle of incidence of the cane sections, straw and foreign matter being fed by the conveyor belt 12 to facilitate the separation of straw and foreign matter from the cane sections as a result of the air blast from the fan 7.

The unloading conveyor belt shown in FIG. 6 is made in two parts including a lower part curved upward, which serves as a bottom for the box 60 and an upper part which pivots on the former and which is foldable from an extended, working position to a folded, traveling position in order to reduce the width of the machine when moving it from one place to another. The unloading belt is equipped, at its upper end, with deflecting plate 31 to guide the cane sections onto the vehicle, thus keeping the cane sections from dripping therefrom.

We claim:
1. A harvesting machine for sugarcane, the machine comprising:
   a mobile chassis supported on ground wheels;
   a framework structure mounted on the chassis and including a member having a support pivotally secured thereto;
   hydraulic cylinder means for pivoting the support;
   a vertically adjustable top cutting mechanism secured to the support and projecting forwardly of the framework, said mechanism including a rotating, horizontally disposed cutting disc with a series of substantially rectangular blades thereon, and a pair of arms extending forwardly from the disc, said hydraulic cylinder means for pivoting the support being operated to adjust the vertical position of the top cutting mechanism;
   rods on said arms of said top cutting mechanism to direct sugarcane into contact with the movable chains thereof, the arms being outwardly curved;
   a series of curved paddles on the disc to discharge cut cane tops therefrom;
   a shield concentric with and below the disc, said shield completely covering the disc and side plates on either side of the top cutting mechanism to protect machine elements from the product of the top cutting mechanism;
   a movable chain on each of said arms, the chains having outwardly extending fingers which engage the sugarcane tops and bring the cane into contact with the disc;
   a stalk severing mechanism comprising a pair of hollow, substantially vertical walls secured to the framework structure of the chassis forwardly thereof, a pair of oppositely rotating horizontal cutters disposed between the vertical walls, the rotating horizontal cutters being inclined forwardly, hydraulically controlled skids on the walls to adjust the height of the cutters, and drive means for the cutters;
   said hollow walls securedly interconnected to the chassis by coil spring means so as to be free floating;
   means for gathering and cutting fallen cane disposed within one of the hollow walls comprising an endless chain having fingers thereon, and a vertical cutter adjacent the chain to cut the fallen cane engaged by the fingers;
   said gathering means and cutting means being in parallel spaced relationship within each hollow wall such that the gathering means is located entirely in a vertical plane and spaced inward of the cutting means;
   a first conveyor to receive the stalks cut by the horizontal cutters and the vertical cutter;

a pair of rotating drums with associated knife means to receive the stalks from the first conveyor and to cut the stalks into sections;

air blast means to separate straw and other foreign matter from the sections of cane, and including a deflector comprising a rotating drum, said deflector positioned above and rearwardly of said air blast means; and an articulated loading conveyor on the framework structure movable from a folded transport position to an extended work position.